(12) United States Patent
Matta et al.

(10) Patent No.: US 7,729,268 B2
(45) Date of Patent: *Jun. 1, 2010

(54) METHOD AND APPARATUS FOR QUALITY OF SERVICE DETERMINATION

(75) Inventors: Johnny Mikhael Matta, Montreal (CA); Ravi Kumar Jain, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1300 days.

This patent is subject to a terminal disclaimer.

(21) Appl. No.: 10/797,404

(22) Filed: Mar. 9, 2004

(65) Prior Publication Data

US 2005/0111487 A1    May 26, 2005

Related U.S. Application Data

(63) Continuation-in-part of application No. 10/185,131, filed on Jun. 28, 2002.

(60) Provisional application No. 60/457,902, filed on Mar. 27, 2003, provisional application No. 60/533,186, filed on Dec. 29, 2003.

(51) Int. Cl.
*H04L 12/26* (2006.01)

(52) U.S. Cl. .................................................. 370/252

(58) Field of Classification Search ................ 370/465
See application file for complete search history.

(56) References Cited

U.S. PATENT DOCUMENTS 5,563,875 A * 10/1996 Hefel et al. ............... 370/249
6,215,772 B1 * 4/2001 Verma .......................... 370/236
6,498,782 B1   12/2002 Branstad et al.
6,760,768 B2 * 7/2004 Holden et al. ................ 709/227
7,068,677 B1 * 6/2006 Arai et al. .................... 370/447
7,088,706 B2 * 8/2006 Zhang et al. ................. 709/227
2002/0133614 A1   9/2002 Weerahandi et al.
2003/0016630 A1   1/2003 Vega-Garcia et al.
2003/0040320 A1 * 2/2003 Lucidarme et al. .......... 455/452

(Continued)

FOREIGN PATENT DOCUMENTS

JP    2001-119434    4/2001

OTHER PUBLICATIONS

E. Crawley, R. Nair, B. Rajagopalan, H. Sandick, A framework for Qos-based routing the Internet, *RFC 2386*, Aug. 1998.

(Continued)

*Primary Examiner*—Chi H Pham
*Assistant Examiner*—Mohammad S Adhami
(74) *Attorney, Agent, or Firm*—Blakely, Sokoloff, Taylor & Zafman LLP

(57) ABSTRACT

A method of estimating bandwidth capacity, available bandwidth and utilization along a path in an IP network is disclosed. ICMP time-stamp requests are sent from a source host on the edge or inside the network to all routers on the end-to-end path to a desired destination. Differences between time-stamp values are used as indicators of QoS service at each router. The collected measurements are then processed at the sending host to infer QoS parameters in terms of path capacity in bit/sec, available bandwidth in bits/sec, individual link utilization and congestion at each router. These parameters can be combined to infer the QoS service in terms of bandwidth on the end-to-end path.

35 Claims, 7 Drawing Sheets

U.S. PATENT DOCUMENTS

| | | | |
|---|---|---|---|
| 2003/0152034 A1* | 8/2003 | Zhang et al. | 370/252 |
| 2003/0236827 A1* | 12/2003 | Patel et al. | 709/203 |
| 2004/0025018 A1* | 2/2004 | Haas et al. | 713/168 |
| 2004/0146056 A1* | 7/2004 | Martin | 370/401 |
| 2004/0210632 A1* | 10/2004 | Carlson et al. | 709/203 |
| 2005/0108420 A1 | 5/2005 | Brown et al. | |
| 2005/0111487 A1* | 5/2005 | Matta et al. | 370/468 |
| 2007/0233946 A1* | 10/2007 | Jewett et al. | 711/112 |

OTHER PUBLICATIONS

Caida, "DOE SCiDAC bandwidth estimation project: Goals and objectives," online documentation, http://www.caida.org/projects/bwest/plan.xml.

AT&T Research, "Network measurement tools . . . unclogging network traffic jams," online documentation, http://www.research.att.com/projects/NetworkMeasurementTools/.

N. McKeown, "EE384x: Packet switch architectures," online documentation, http://www.standford.edu/class/ee384x/.

M. Jain, C. Dovrolis, "End-to-end available bandwidth: Measurement methodology, dynamics and relation with TCP throughput," *Proc. of ACM Sigcomm 2002*, in press.

M. Jain, C. Dovrolis, "Pathload: a measurement tool for end-to-end available bandwidth," *Proc. of PAM 2002*.

S. Keshav, "A control-theoretic approach to flow control," *Proc. Of ACM Sigcomm 1991*.

J. Postel, "Internet control message protocol," *RFC 792*, Sep. 1981.

K. Lai, M. Baker, "Measuring link bandwidths using a deterministic model of packet delay," *Proc. of ACM SIGCOMM 2000*.

Caida, "Packet wingspan distribution: assessing average hop count of a wide area Internet packet," online documentation, http://www.nlanr.net/NA/Learn/wingspan.html.

K. Lai, M. Baker, "Nettimer: A tool measuring bottleneck link bandwidth," *Prod. Of 3rd USENIX Symposium on Internet Technologies and Systems*, Mar. 2001.

C. Dovrolis, P. Ramanathan, D. Moore, "What do packet dispersion techniques measure?", *Proc. of Infocom 2001*.

Vern Paxson, "End-to-end internet packet dynamics," *IEEE/ACM Transactions on Networking*, vol. 7, No. 3, pp. 277-292, Jun. 1999.

R. Carter, M. Crovella, "Measuring bottleneck link speed in packet-switched networks," *Technical Report BU-CS-96-006*, Boston University, Mar. 1996.

G. Jin, G. Yang, B. Crowley, D. Agrawal, Network Characterization Service (NCS), *In proc. 10th IEEE Symposium on High Performance Distributed Computing*, Aug. 2001.

Allen B. Downey, "Using pathchar to estimate internet links characteristics," *Proc. Of ACM SIGCOMM 1999*.

T. Oetiker, "MRTG: Multi Router Traffic Grapher," http://ee-staff.ethz.ch/~oetiker/webtools/mrtg/mrtg.html.

Y.Zhang, N. Duffield, V. Paxson, and S. Shenker, "On the Constancy of Internet Path Properties," *Proc. of ACM SIGCOMM Internet Measurement Workshop*, Nov. 2001.

C. Casetti, J. C. De Martin, M. Meo, "A Framework for the Analysis of Adaptive Voice over IP," IEEE ICC 2000, Jun. 18-22, 2000.

K. M. Hanna, N. Natarajan, B. N. Levine, "Evaluation of a novel two-step server selection metric," *Proc. International Conference on Network Protocols (ICNP)*, Oct. 2001.

J. C. Bolot, T. Turletti, "A rate controlled mechanism for packet video in the Internet," *Proc. of IEEE Infocom*, Jun. 1994.

P. Francis et al., "IDMaps: A global Internet host distance estimation service," *IEEE/ACM Transactions on Networking*, Oct. 2001.

M. Karam, F. Tobagi, "Analysis of the decay and jitter of voice traffic over the Internet," *Proc. of Infocom 2001*.

J. Matta, "CATprobe: A tool to estimate congestion and available bandwidth in IP networks", *DoCoMo USA Labs Internal Technical Report*, Jun. 2002.

Cisco Systems, "*Using the client utilities for Windows CE*", online documentation, http://www.cisco.com/univercd/cc/td/doc/product/wireless/airo_350/350cards/windows/legacy/scg/pc_ch6.htm.

T. Yoshimura, T. Ohya, T. Kawahara, M. Etoh, "Rate and robustness control with RTP monitoring agent for mobile multimedia streaming", *in proceedings of IEEE International Conference on Communications ICC* Apr. 2002.

K. Lai, M. Baker, "Nettimer: A tool for measuring bottleneck link bandwidth", *Proc of 3rd USENIX Symposium on Internet Technologies and Systems*, Mar. 2001.

IEEE Std. 8802-11-1999, "*IEEE Standards for Local and Metropolitan Area Networks, Part 11: Wireless LAN Medium Access Control (MAC) and Physical Layer (PHY) specifications*".

Annex A, Recommendation G.729, "coding of Speech at 8 kbit/s using Conjugate Structure Algebraic-Code-Excited Linear-Prediction (CS-ACELP)", Annex A: "Reduced Complexity 8 kbit/s CS-ACELP Speech Codec", *ITU*, Nov. 1996.

J. Gruber, L. Strawczynski, "Subjective Effects of Variable Delay in Speech Clipping in Dynamically Managed Voice Systems", *IEEE Transactions on Communications*, vol. 33, No. 8, Aug. 1995.

D. Mills, "Network time protocol (Version 3) specification, implementation and analysis", *RFC 1305*, Mar. 1992.

M. Yajnik, S. Moon, J. Kurose, D. Towsley, "Measurement and modeling of the temporal dependence in packet loss", *In proceedings of IEEE Infocom*, Mar. 1999.

J. C. Bolot, A.V. Garcia, "Control mechanisms for packet audio in the Internet", *In proceedings of IEEE Infocom*, Mar. 1999.

S. M. Ross, Introduction to probability models, sixth edition, *Academic Press*, San Diego, 1997.

H. Sanneck, G. Carle, R. Koodli, "A framework model for packet loss metrics based on loss run length", *In proceedings of SPIE/ACM SIGMM Multimedia Computing and Networking Conference*, Jan. 2000.

Y. Zhang, N. Duffiled, V. Paxson, S. Shenker, "On the constancy of Internet path properties", *In proceedings of ACM SIGCOMM Internet Measurement Workshop*, 2001.

R. Jagadeesan, "Packet loss model", *TIA Study Group* 41.3.3, contribution TR41.3.3/00-02/2005, Feb. 2000.

Japanese Office Action for Japanese Patent Application No. 2004-096191, dated Aug. 11, 2009, 7 pgs. *English Translation*.

* cited by examiner

Note: $K_i$ is packet $i$

METHOD AND APPARATUS FOR QUALITY OF SERVICE DETERMINATION

This application is a continuation-in-part of U.S. application Ser. No. 10/185,131, entitled "Catprobe", filed Jun. 28, 2002.

PRIORITY

The present patent application claims priority to U.S. provisional patent application Ser. Nos. 60/457,902, entitled "Wirelesscat," filed on Mar. 27, 2003 and 60/533,186, entitled, "Catprobe," filed on Dec. 29, 2003, and are hereby incorporated by reference herein.

FIELD OF THE INVENTION

The present invention relates generally to IP communication networks and more particularly to a quality of service estimation method for communication paths on IP networks.

BACKGROUND OF THE INVENTION

The "best-effort" nature of the Internet makes the QoS (Quality of Service) perceived by end users unpredictable and sometimes largely varying. Fast, accurate and efficient tools for estimating QoS performance of IP networks are gaining importance in the networking community. This is because such information can be used to maintain expected user and provider service under the varying conditions inherent to packet networks, especially the Internet. Specific applications include congestion control, real-time streaming and two-way communication, QoS verification, server selection and network administration.

QoS estimation can be broadly classified into two categories: passive monitoring and active monitoring. The passive monitoring approach has the advantage of not injecting additional probing traffic into the network. It observes the network as it is, meaning that the measurements are an assessment of true network behavior since this latter is not disturbed by probing traffic intended for those measurements.

The monitoring can take different levels of granularity depending on the degree of processing, storage and resources available. Packet monitoring, for example, allows observation of packet-by-packet information such as packet delay variation, packet size distribution, and throughput between host pairs. A higher level, with less overhead, can be achieved by flow level measurements to record the total number of bytes transferred, the flow start and finish time, among others.

The main advantage of passive probing techniques is that they do not introduce a load on the network they monitor, which also means they do not distort the network traffic and therefore produce realistic estimates. However, their handicap is that they rely on existing traffic, which is not guaranteed to have desired characteristics for certain measurements. Bottleneck bandwidth measurement techniques, for example, require a certain packet size distribution and inter-packet departure rate often not met. Traffic monitoring consists in passively observing traffic characteristics for the purpose of inferring network performance.

SNMP (Simple Network Management Protocol) and RMON (Remote Monitoring) are the most widely adopted standards for passive monitoring and typically consist of management agents or probes installed at various network elements (hosts, routers, switches), a MIB (management information base) containing collected data from the agents, a management station or console, which collects the information from the probes, and a protocol for the exchange of information between stations and probes. MIBs comprise several groups such as statistics collected at the physical or IP layers for packet sizes, CRC errors, and so forth. Traffic monitoring with administrative control requires the transfer of collected information from agents to consoles, thus placing a burden on the network being monitored. Sometimes, sampling of data in MIBs can be used to reduce the amount of traffic exchanged.

Active monitoring obtains an inference of network QoS by sending probes across the network and observing the treatment they receive in terms of delay in delivery to the destination, variability in that delay and loss. A large variety of such tools exist to estimate performance in terms of delay, jitter, packet loss, and bandwidth. They generally either use Internet Control Message Protocol (ICMP) error messaging capabilities or packet dispersion techniques.

Link capacity estimation in bits/sec has traditionally been achieved through the use of packet dispersion techniques, which consist of the successive transmission of groups of two or more packets. The concept is that packets from the same group will queue one after another at the bottleneck link of the path. With the absence of large interference from competing traffic (i.e. from other sources), the dispersion (i.e. the difference in packet arrival times at the receiver) will be inversely proportional to the bandwidth of the bottleneck. Examples of tools using this approach include Nettimer, Pathrate and Packet Bunch Mode (PBM).

Another approach for capacity estimation builds on the ICMP Time Exceeded message option. Pathchar, the precursor of this technique, performs measurements by sending packets with increasing IP Time-to-Live (TTL) values, thereby forcing routers along the path to send back ICMP error messages and revealing themselves. A measurement of round-trip delays to successive hops on the end-to-end path thereby leads to per hop delay estimation. Pathchar also adds the feature of varying packet sizes for each TTL value, thus inferring link capacity as the slope inverse of the line connecting minimum observed delay for each packet size. Other tools exist like Pchar and Clink but they build on the same concepts as Pathchar.

Cprobe and Pipechar were tools proposed to estimate available bandwidth on a path. These tools use long packet train dispersion and assume that dispersion of such trains is inversely proportional to the rate available for transmission at the bottleneck hop, i.e., available bandwidth. Recent research, however, has shown that the inverse of such dispersions does not in fact measure available bandwidth but another parameter referred to as ADR (Asymptotic Data Rate).

Another tool, Delphi, assumes Internet paths can be modeled by a single queue, which makes it perform badly in the presence of large queuing delays at several links on the path or when the bottleneck capacity and bottleneck available bandwidth links are located at different links.

At the present time, there is only one known tool that is capable of estimating available bandwidth, which is Pathload. Pathload operates by performing several iterations, varying the transmission rate at each and observing delay variation at the receiver, with a goal of finding the maximum rate that does not cause delay increase. Pathload builds on the simple principle that the observed end-to-end delay at the receiver increases when the transmission rate at the source exceeds the available bandwidth on the path; a realistic observation knowing that traffic injected onto the path faster than the bottleneck can service will cause queue build up at that hop, hence increasing queuing delay and delay altogether.

SUMMARY OF THE INVENTION

A method and apparatus for estimating QoS in a network. In one embodiment, the method comprises probing an end-to-end path to identify addresses of all hops on the end-to-end path, generating at least one time-stamp request packet, transmitting the at least one time-stamp request packet to at least one hop on the end-to-end path, generating a time-stamp in response to the time-stamp request packet with the hop, and processing the time-stamp to produce at least one QoS estimate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
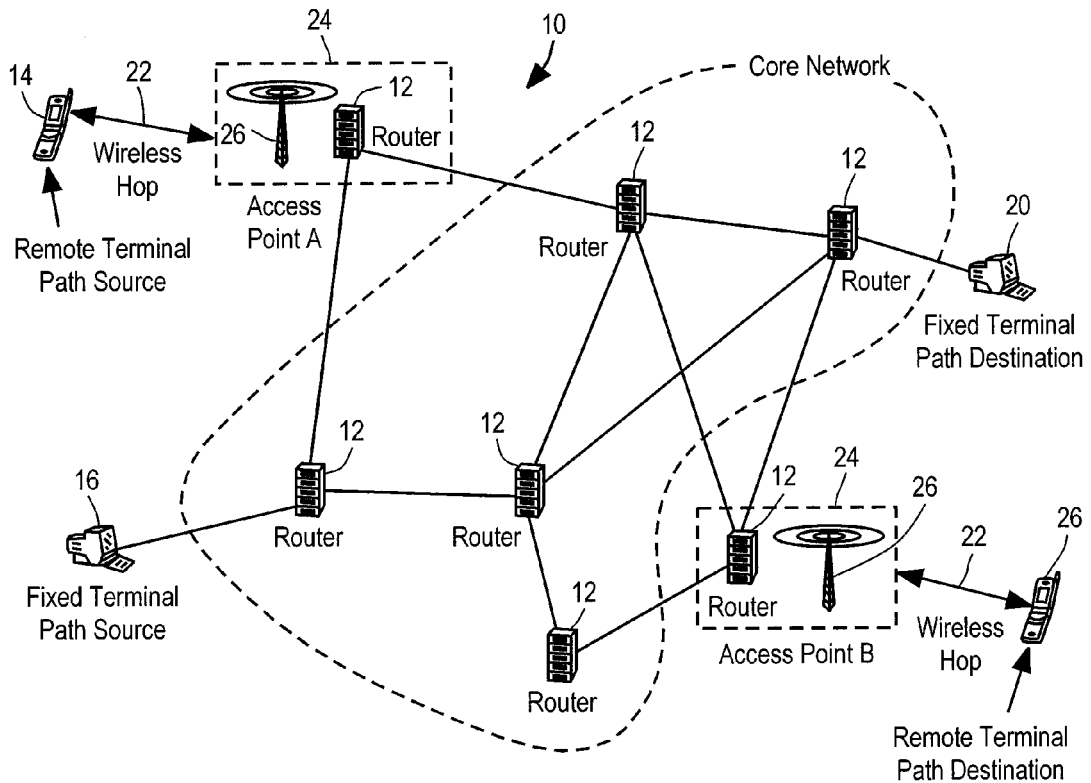
FIG. 1 illustrates an example of an IP network.

A method and apparatus for producing QoS estimates for communication paths in IP networks are disclosed. The communication paths may be between two given routers or hosts on an IP network. The QoS estimation technique may be used on a regular basis to poll a desired transmission path. One embodiment of a method of producing estimates comprises first identifying network addresses of all routers or hosts on the end-to-end path of interest and then transmitting pairs of time-stamp requests to each router or host on the end-to-end path. Finally, the time-stamp requests that are returned by the routers or hosts are processed to produce QoS estimates. For the purpose of the present invention, the term "hop" will be used collectively to refer to routers and hosts along the end-to-end path between respective terminals or nodes.

In one embodiment, the technique to obtain addresses of hops on the path uses a Traceroute application. In addition, in one embodiment, time-stamp requests are obtained using ICMP time-stamp request/reply options. After using Traceroute to determine the addresses of all hops on the desired path, a group of ICMP time-stamp requests is sent from the source at one end of the path to each router on the desired path. In one embodiment, the group of ICMP time-stamp requests comprise five ICPM time-stamp requests. The first three packets of each group are used to determine initial conditions for the measurement to the corresponding host or router (i.e., hop on the path). The remaining two probing packets of the group of five are used to obtain an estimate of the total time spent by an ICMP request packet at the corresponding hop.

Another pair of similar ICMP time-stamp request packets is sent to each hop to similarly estimate the total time spent by an ICMP request packet at each hop. These may be sent at regular intervals. Such successive measurements may be used to infer queuing delay variation at each hop. In one embodiment, the estimates are formed at the originating source or node. In another embodiment, such estimates are formed at the receiver or destination node.

In one embodiment, the total service time at each hop and the queuing delay variation are used to estimate the utilization in the direction of the path at each hop, which refers to the fraction of free transmission resources not used by competing traffic at the link. The estimates that are formed are also used to estimate the available bandwidth of each link in the direction of the path, which refers to the rate the link can further sustain without the occurrence of congestion and queue build up at the link. In addition, the estimates are used to estimate the rate of incoming traffic from competing sources to the link.

In one embodiment, the technique described herein is performed by an application that resides at one node only that originates the QoS measurement. This node performs the processing required to generate QoS estimates based on collected time-stamp values from the hops. In another embodiment, this application resides at both source and receiver on the path of interest. In that case, the receiver may be in charge of processing the collected time-stamps and processing them. One difference in this embodiment is that ICMP packets sent to routers have an address spoofed to the destination such that replies are sent to the receiver instead of the source, which would have originated the ICMP requests.

Further advantages of the present invention will be apparent from the following description, reference being made to the accompanying drawings wherein preferred embodiments of the invention are clearly illustrated.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1 is a block diagram of one embodiment of an IP network. Referring to FIG. 1, an IP network 10 is generally illustrated that includes hosts or routers 12 and at least two terminals or nodes communication with each other through respective hosts or routers 12 on IP network 10. Information is communicated through the IP network 10 as packets or datagrams. The terms "packet" and "datagram" are used interchangeably herein to refer to a data package having a header.

The collection of hosts or routers 12 and terminals or nodes at each end and the links connecting them constitute a path. When transmitting, a packet or datagram will make several hops in order to reach its destination. These hops may be across hosts or routers 12 and, as such, as used herein, the term "hop" should be construed to include both hosts and routers 12. The transmitting node or terminal can be referred to as a path source (or source, in short) and the receiving node or terminal can be referred to as a path destination (or destination, in short). As illustrated, source terminals can either be remote terminals 14 or fixed terminals 16. Likewise, destination terminals can be either remote terminals 18 or fixed terminals 20.

In one embodiment, fixed terminals 16 and 20 directly connect through a fixed link to a respective router 12, remote terminals 14 and 18 connect through a wireless link 22 to an access point 24. An access point may include a wireless communication tower 26 and a router 12. Alternatively, an access point 24 may include a wireless local area network (WLAN) compliant access point 26, such as an IEEE 802.11 access point with our without an associated router 12.

Remote terminals 14 and 18 are illustrated as wireless telephones, but those skilled in the art would recognize that other remote terminals such as personal digital assistants (PDA), laptops, or the like might be used on the wireless IP network 10. As such, the depiction of a wireless telephone in FIG. 1 should be viewed in an illustrative sense and not as a limitation of the present invention. As further illustrated in FIG. 1, each router 12 is connected to at least one other router 12 to enable IP packet transmission among terminals across the IP network 10.

WiredCat

Figure 2:
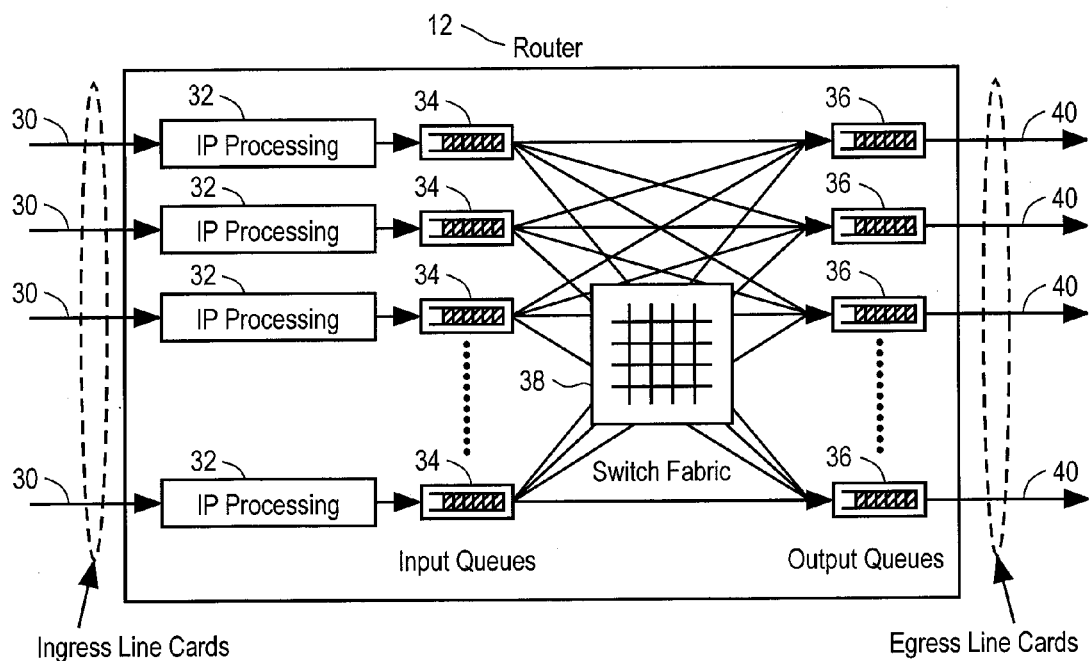
FIG. 2 is a block diagram of router packet processing.

FIG. 2 is a block diagram of one embodiment of IP packet processing in a router 12. Referring to FIG. 2, IP packets arrive at multiple ingress line cards 30 and enter an IP processing stage 32. Packets are then typically placed in an input queue 34 or an output queue 36, depending on the specific implementation of the router 12. A switch fabric 38 directs packets to an appropriate egress line card 40. Queuing can be at either the input to switch fabric 38 or the output (although most modern routers implement input queuing). However, it always occurs after IP processing 32. As set forth in greater detail below, in the case of use of the ICMP time-stamp option, the time-stamp retrieved by the ICMP time-stamp request records the time before entry into input queues 34 or output queues 36. The IP processing time is small since packets are usually handled at wire speed at that stage so that waiting time and the actual processing time for IP processing stage 32 are negligible compared to the queuing in switch fabric 38 and the transmission time at egress line cards 40. Queuing of a packet after IP processing 32 is due to the waiting time of other packets to reach their turn for transmission. Queuing latency directly relates to the size of the queue upon arrival of the packet under consideration and the transmission speed of the link; the packet needs to wait for the queue ahead to empty before it can be transmitted.

In the discussion set forth below, the following notations are used and refer to the following items: $t_n$ or n in short is the continuous time at which an event is recorded; $Q_i(n)$ is the size in bits of the queue in link i at time n; $B_i$ the capacity of link i in bits/sec; $R_i(n)$ is the sum of all incoming flow rates to the queue in link i in bits/sec at time n; $q_i(n)$ is the queuing delay in router i at time n; $u_i(n)$ is the utilization of link i at time n; and m is the packet size in bits.

For a packet entering the queue at time n, the size of the queue ahead of it is $Q_i(n)$. The queuing delay $q_i(n)$ of that packet is the time required to empty the queue in link i at rate $B_i$ (i.e., the queuing delay of the packet), which can be represented as:

$$q_i(n) = \frac{Q_i(n)}{B_i} \tag{1}$$

The rate $B_i$ is referred to as capacity, the total bit forwarding speed of a link. In other words, it is the transmission rate of the link. This value is therefore fixed for a given router 12 and network wire configuration.

Figure 3:
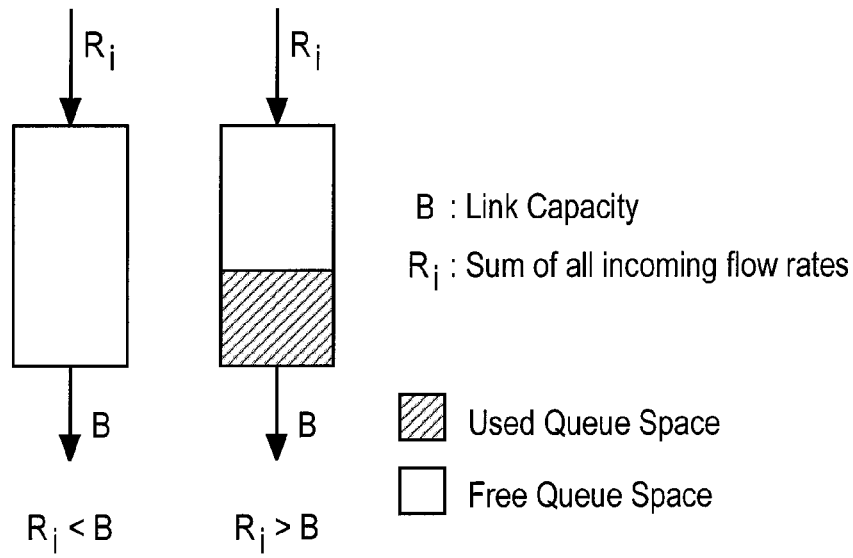
FIG. 3 illustrates an exemplary varying of queue size with incoming rate.

FIG. 3 depicts the change in queue size (hence, queuing time) with the variation of incoming flow rates. As long as $R_i$ is less than the speed $B_i$ at which the link can serialize bits on output linecard 40, the queue size will not increase. However, because of the bursty nature of Internet traffic, it is possible that $R_i$ may exceed the capacity $B_i$, thereby causing queue build up. For the purpose of the present invention, the utilization of link i at time n is defined by:

$$U_i(n) = R_i(n)/B_i \quad (2)$$

Referring to FIG. 3, the following equation can be obtained:

$$Q_i(n) = \max\left\{\sum_{r=1}^{n}[R_i(r) - B_i](t_r - t_{r-1}), 0\right\} \quad (3)$$

or:

$$Q_i(n) = \max\{[R_i(n) - B_i](t_n - t_{n-1}) + Q_i(n-1), 0\} \quad (4)$$

where, for simplicity, it is assumed that upon network initialization at time zero, the queue at all links is empty, hence $Q_i(0)=0, \forall i$.

Note that the time interval $(t_{r-1}, t_r)$ is not set to unity since this interval will be varied later. Using equations (1) and (3):

$$q_i(n) = \frac{\max\left\{\sum_{r=1}^{n}[R_i(r) - B_i](t_r - t_{r-1}), 0\right\}}{B_i} \quad (5)$$

Using equations (1) and (4):

$$q_i(n) = \max\left\{\frac{[R_i(n) - B_i](t_n - t_{n-1})}{B_i} + q_i(n-1), 0\right\} \quad (6)$$

Substituting equation (2) in (6) results in:

$$q_i(n) = \max\{[u_i(n) - 1](t_n - t_{n-1}) + q_i(n-1), 0\} \quad (7)$$

Hence:

$$u_i(n) = \max\left\{\frac{[q_i(n) - q_i(n-1)]}{(t_n - t_{n-1})} + 1, 0\right\} \quad (8)$$

The traversing time $T_i(n)$ is the time needed for a chunk of m bits to traverse a link at time n, namely:

$$T_i(n) = \frac{m}{B_i} + q_i(n) \quad (9)$$

The quatity $m/B_i$ is also referred to as transmission time of the link; traversing time as defined herein is therefore the sum of transmission and queuing delays while neglecting propagation and processing delays. Using equation (7) in (9):

$$T_i(n) = \frac{m}{B_i} + \max\{[u_i(n) - 1] \times (t_n - t_{n-1}) + q_i(n-1), 0\}$$

Hence:

$$B_i = \frac{m}{T_i - \max\{[u_i(n) - 1](t_n - t_{n-1}) + q_i(n-1), 0\}} \quad (10)$$

Then, substituting equation (2) in (10):

$$R_i = \frac{u_i(n)m}{T_i(n) - \max\{[u_i(n) - 1](t_n - t_{n-1}) + q_i(n-1), 0\}} \quad (11)$$

Available bandwidth for a new flow is the rate a link can support such that the queue size (i.e., queuing delay) does not increase. In other words, available bandwidth is the fraction of the capacity B of the link that is not used by competing flows with sum of rates R:

$$AvBw_i(n) = B_i - R_i(n) \quad (12)$$

Substituting equation (2) in (12) yields:

$$AvBw_i(n) = B_i[1 - u_i(n)]u_i(n) \leq 1 \quad (13)$$

$AvBw_i(n)$ is the available bandwidth of link i at time n.

The available bandwidth metric can be used to assess the margin of additional input flows the path can take before congestion starts building up, hence leading to increased delay and jitter. Bandwidth requirements for voice coders, for example, are in terms of available bandwidth.

Throughput is usually measured by observing the time required to get a certain amount of bits across a link or path. As such, throughput is the ratio of bits to total time to get them through. Throughput of link i as measured at the receiver can therefore be written as follows:

$$ThrBw_i(n, k) = \frac{k}{\frac{k}{B_i} + q_i(n)} \quad (14)$$

where $ThrBw_i(n,k)$ is throughput in bits/sec in link i at time n, k the size in bits of the data packets observed, which is also referred to as a data chunk (possibly composed of packets of different sizes), $B_i$ the link capacity and $q_i$ the queuing delay of the k bits chunk at the link.

Over a path comprised of several links, and using equation (14) the throughput equation becomes:

$$ThrBw_{path}(n, k) = \frac{k}{\sum_{i \in path}[k/B_i + q_i(n)]} = \frac{1}{\sum_{i \in path}\frac{1}{ThrBw_i(n, k)}} \quad (15)$$

The denominator on the right-hand side of equation (15) actually corresponds to the delay needed to traverse a link and path respectively. Throughput is therefore a good indicator of delay conditions in the network. As such, throughput does not in itself describe capacity or available bandwidth of the links or path as defined herein. It does relate to those metrics, however, in the following way:

Equations (2) and (5) in the continuous domain also give:

$$q_i(n) = \max\left\{\int_{t_0}^{t_n}[u_i(r)-1]dr, 0\right\}$$

Then, using equation (13):

$$q_i(n) = \max\left\{-\int_{t_0}^{t_n}\frac{AvBw_i(r)}{B_i}dr, 0\right\}$$

Finally, this result in equation (14) gives:

$$ThrBw_i(n,k) = \max\left\{\frac{B_i}{1-\frac{1}{k}\int_{t_0}^{t_n}AvBw_i(r)dr}, B_i\right\} \quad (16)$$

Figure 4:
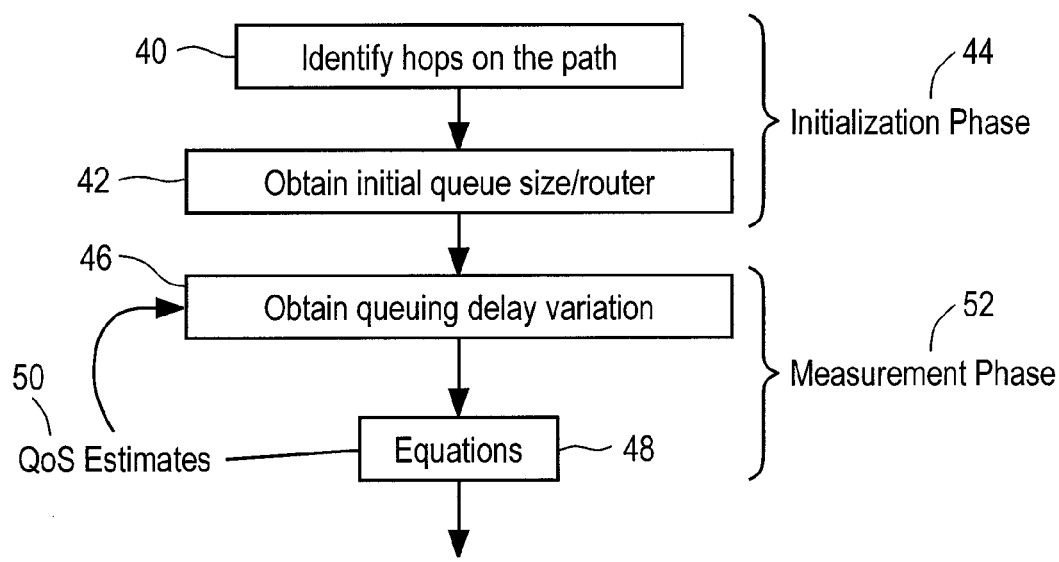
FIG. 4 is a flow diagram of one embodiment of a process for generating QoS estimates.

FIG. 4 is a general flow diagram of one embodiment of a process for generating QoS estimates. The process is performed by processing logic that may comprise hardware (circuitry, dedicated logic, etc), software (such as is run on a general purpose computer system or a dedicated machine), or a combination of both. The essence of the process consists of estimating the variation in queuing delay at successive hops. Then, equations (2), (10), (11) and (12) above are used to deduce the capacity B, available bandwidth AvBw, sum of incoming competing flow rates R and utilization u.

As depicted in FIG. 4, the process begins by processing logic identifying network addresses of all routers 12 (hops) along the path from path source 14 and 16 to path destination 18 and 20 (processing block 40). In one embodiment, this is achieved using a Traceroute application. Next, processing logic obtains a first estimate of the queuing delay at each hop on the path (processing logic 42). Processing blocks 40 and 42 form an initialization or bootstrap phase 44 of the processor. From then on, pairs of ICMP time-stamp requests are sent to each router 12 on a regular interval. This allows monitoring queuing delay variation 46 at routers 12 using the equations described above (processing block 48). In one embodiment, each ICMP time-stamp request produces one estimate for each router 12 of the QoS parameters capacity, available bandwidth and throughput, which is illustrated as QoS estimates 50 in FIG. 4. In addition, link utilization and size of competing traffic is estimated. Processing blocks 46, 48 and 50 form a measurement phase (52).

In one embodiment, measurement begins by invoking Traceroute application to destination sources 18 and 20 to identify all the hops on the end-to-end path. Once the list of hops is obtained, pairs of ICMP time-stamp requests are used to obtain the variation delay at each of the hops. Below is a discussion of how this is achieved for one hop, the procedure is identical for the remaining hops on the path.

Figure 5:
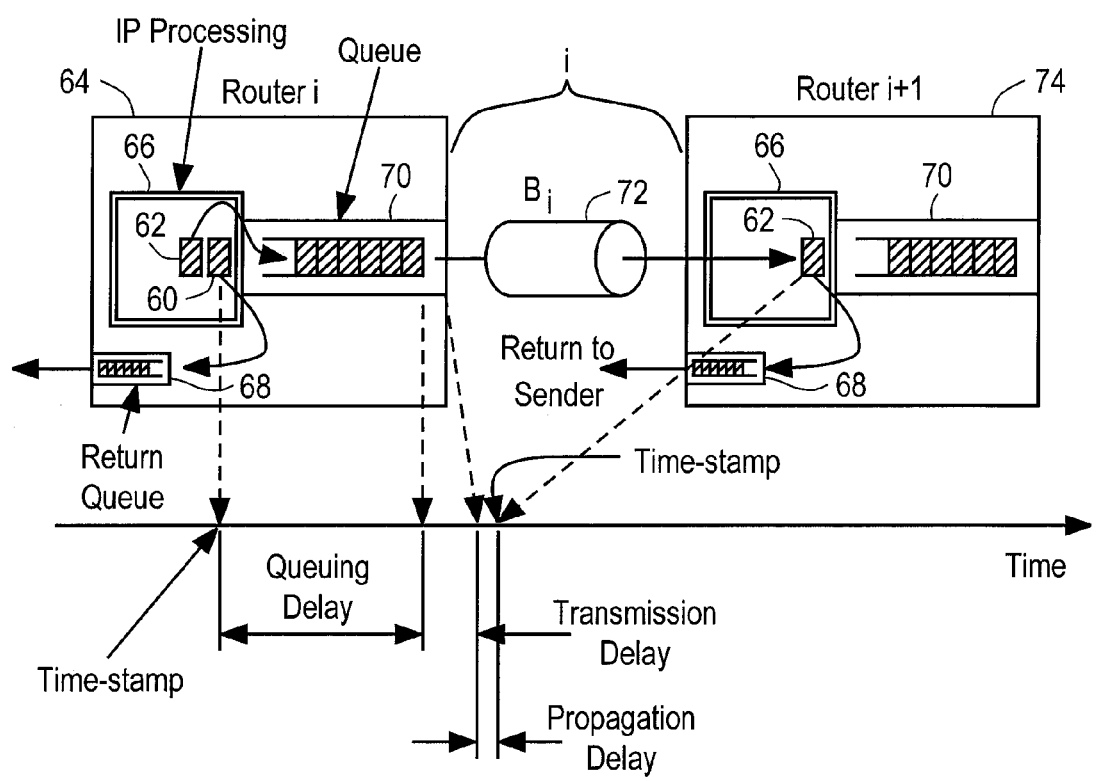
FIG. 5 illustrates an exemplary ICMP time-stamp request processing at a desired pair of hops.

FIG. 5 depicts one embodiment of the processing of a pair of ICMP time-stamp requests 60 and 62 at consecutive routers 12. Upon arrival at a router 64, packet 60 receives a time-stamp from an IP processing unit 66. Then, in one embodiment, packet 60 returns to its originator through a return queue 68 of router 64. Packet 62 continues through a forward queue 70 through a link 72 and arrives at the IP processing unit 66 of router 74 where it receives a time-stamp. Then, in one embodiment, packet 62 returns to its originator through return queue 68 of the router 74.

To obtain the queuing delay variation at the link from router 64 to the router 74 depicted in FIG. 5, two ICMP time-stamp requests are sent one after another with no time difference between the transmission of the last bit of the first packet and that of the first bit of the second packet. The ICMP request of the first packet is directed towards the first router 64, while that of the second packet is sent to the second router 74. Packets of the same pair are identified using an Identifier or Sequence Number field in the ICMP packet.

The time-stamp at the first router 64 of the first packet of the pair is denoted by $\Theta_i^1$; and that of the second packet of the same pair at the second router 74 by $\Theta_{i+1}^2$. For the purpose of identifying different measurements on a time-scale and without loss of generality, it is assumed that the time-stamps reported by ICMP time-stamp requests of the same pair are both recorded at the time that the second packet of the pair receives its time-stamp. This is equivalent to the notation $\Theta_i^1(j)$ and $\Theta_{i+1}^2(j)$, meaning that both time-stamps are collected at the same time instant j. The following relation gives the difference between these two time-stamps:

$$\Theta_{i+1}^2(j) - \Theta_i^1(j) = \frac{m}{B_i} + q_i(j) + d_{i\to i+1}(j)$$

where m is the size of the ICMP time-stamp request packet (namely 40 bytes; 20 bytes for each of ICMP and IP), $q_i(j)$ is the queuing delay of the packet pair j waiting to be transmitted from the first router 64 to the second router 74, and $d_{i\to i+1}(j)$ is the propagation delay between the two routers.

In one embodiment, one assumption that is made is that the time-stamp of the first packet not only denotes the time at which the packet is leaving the IP processing stage at router 64, but also that of the second packet at the same stage. This assumption requires the two ICMP packets to arrive after the other at router 64, i.e., no interfering traffic between the two packets until they reach router 64 to be queried.

Neglecting propagation and processing delay, the equation obtained is:

$$\Theta_{i+1}^2(j) - \Theta_i^1(j) = \frac{m}{B_i} + q_i(j) \quad (17)$$

Equation (17) above is the same as equation (9), i.e., it defines the traversing time across the link 72 from router 64 to router 74, taking into account the transmission and queuing times at that link and neglecting propagation and processing delays.

After the transmission of the first pair, the sender waits for a user-defined delay $\alpha$ before sending the next pair. In turn, the measurements collected are $\Theta_i^1(j+1)$ and $\Theta_{i+1}^2(j+1)$. Therefore, the queuing delay variation is deduced as follows:

$$[\Theta_{i+1}^2(j+1)-\Theta_{i+1}^2(j)]+[\Theta_i^1(j)-\Theta_i^1(j+1)]=q_i(j+1)-q_i(j) \quad (18)$$

Now using equation (8):

$$u_i(j+1) = \max\left\{\frac{[q_i(j+1)-q_i(j)]}{[\Theta_{i+1}^2(j+1)-\Theta_{i+1}^2(j)]} + 1, 0\right\}$$

$$u_i(j+1) = \max\left\{\frac{[\Theta_{i+1}^2(j+1)-\Theta_i^1(j+1)]-[\Theta_{i+1}^2(j)-\Theta_i^1(j)]}{\Theta_{i+1}^2(j+1)-\Theta_{i+1}^2(j)} + 1, 0\right\} \quad (19)$$

where $u_i(j+1)$ is the utilization at link i 72 between router 64 and router 74 as observed between the two measurement pairs j and j+1 at time $t_j$, respectively. In addition:

$$\Theta_1^2(j+1) - \Theta_i^2(j) = \alpha + \sum_{1 \leq k \leq i} \Delta q_k(j)$$

From equation above, $$\sum_{1 \leq k = \leq i} \Delta q_k(j)$$

is the queuing delay variation happening at all upstreaming nodes before measured node i. As a result, the queueing delay set $\{\Delta q_k(j), k \in [1,l]\}$ can only be solved iteratively. At first, the queuing delay at first node, $\Delta q_1(j)$, is solved by $$\Delta q_1(j) = \Theta_1^2(j+1) - \Theta_1^2(j) - \alpha.$$

Next, assume, for any $k \leq N$ node, $\Delta q_k(j)$ is known, $\Delta q_{N+1}(j)$ is calculated according to $$\Delta q_{N+1}(j) = \Theta_{N+1}^2(j+1) - \Theta_{N+1}^2(j) - \alpha - \sum_{k=1}^{N} \Delta q_k(j).$$

Now, the capacity $B_i$ can be determined using equation (17):

$$B_i = \frac{m}{\Theta_i^2(j) - \Theta_i^1(j) - q_i(j)} \quad (20)$$

The unknown variable in equation (20) is the queuing delay at time $t_j$ in router 64. However, it is known that:

$$q_i(j) = q_i(j-1) + \Delta q_i(j-1,j) \quad (21)$$

where $\Delta q_i(j-1,j)$ is the variation in the queuing delay at router 64 as observed between packet pairs j-1 and j. Hence:

$$q_i(j) = \sum_{r=1}^{j} \Delta q_i(r-1, r) + q_i(0) \quad (22)$$

In equation (22), $q_i(0)$ is an estimate of the queuing delay encountered by packets of the first pair sent at the start of the measurement. An estimate of the first queuing delay $q_i(0)$ at router 64 is obtained at the very start of the measurement process; first, by sending three consecutive ICMP time-stamp requests, the first one to router 64 and the next two to router 74.

This will lead to the following:

$$\Theta_{i+1}^3(0) - \Theta_{i+1}^2(0) = \frac{m}{B_i(0)}$$

Hence, an estimate of the capacity $B_i$ at time 0 of the link from the first router 64 to the second router 74 is obtained:

$$B_i(0) = \frac{m}{\Theta_{i+1}^3(0) - \Theta_{i+1}^2(0)} \quad (23)$$

The estimate of the capacity Bi will later be refined as the measurements progress as described below. However, the equation (17) at time 0 can also be written:

$$\Theta_{i+1}^2(0) - \Theta_i^1(0) = \frac{m}{B_i(0)} + q_i(0)$$

which, when plugged in to equation (23):

$$q_i(0) = 2 \times \Theta_{i+1}^2(0) - \Theta_i^1(0) - \Theta_{i+1}^3(0) \quad (24)$$

This initial estimate of the queuing delay at link i can be used throughout the measurement process in equation (22). An estimate of the queuing delay can also be repeated at every measurement event through the same procedure of sending three consecutive ICMP packets to obtain a better estimate for use in equation (22).

Once an estimate of $q_i(j)$ is obtained, it is used in equation (20) to estimate link capacity $B_i$. Hence, $B_i$ can be estimated using equations (20), (22) and (24). Now, the sum of all incoming competing flows $R_i$ can be estimated using equations (2), (19), (20), (22) and (24). This is achieved by first estimating capacity $B_i$, then using equation (19) to estimate utilization and equation (2) to find $R_i$. In addition, available bandwidth $AvBw_i$ can be estimated by using equations (2), (12), (19), (20), (22) and (24) through the same process.

In one embodiment, all routers 12 are probed regularly and at the same frequency. In another embodiment, certain routers 12 can be probed more or less often based on queuing delay variation rate of those routers 12.

In one embodiment, the path hop addresses are identified first before ICMP pair transmission begins. In another embodiment, such pair transmission begins for each hop as soon as that hop is identified.

In one embodiment, ICMP time-stamp requests are the standard size as defined for ICMP protocol. In another embodiment, dummy data can be added in the IP payload field thereby increasing transmission time at the router, a useful feature for very fast links.

In one embodiment, path identification and time-stamp requests are sent from either source or destination hosts. In another embodiment, different time-stamp requests and path identification can be sent from either source or receiver or other hosts on the network simultaneously. In addition, processing of measurements can be achieved at any, some or all hosts on the network including source and destination hosts.

A further extension to the technique described herein includes avoiding the transmission of time-stamp request pairs beyond the slowest link on a path. This is to avoid dispersion between time-stamps as they arrive at the link of interest. To achieve this, probing takes place from either source or destination such that the bottleneck link is avoided. In one embodiment, observing the rate of variation of the different links identifies the bottleneck link. Another extension to the method is to further refine the precision of measurements by taking into account propagation delay on the links. This is achieved using a propagation delay estimate.

An Alternative Wireless Link Embodiment—WirelessCAT

A method and apparatus for estimating an end-to-end path packet loss rate in a network is described. In one embodiment, the method includes probing an end-to-end path to identify queue capacity of all routers on the end-to-end path, transmitting a ping request packet to a hop on the path, and processing a ping reply to produce a QoS estimate. In another embodiment, a method and operations for calculating a QoS value for a wireless link of an end-to-end network path includes measuring an average packet loss value for a wired portion of the network, and calculating a packet loss value for the wireless link as a function of the packet loss value for the wired portion of the network. The discussion of the present invention set forth below describes an embodiment for use with a wireless link 22, and is referred to herein as WirelessCAT.

Referring to FIG. 1, methods that assess network congestion across IP network 10 (such as by observing queuing delay variation at routers 12 along a desired path allow the estimation of available bandwidth AvBw. Although these techniques are used with wired networks, where congestion is solely due to queue build up at routers 12, in a wireless link 22, however, packet congestion may be due to several other factors, in addition to queuing congestion. These include contention for the medium in shared media technologies such as IEEE 802.11, GSM, PCS, and the like. Furthermore, packet congestion in a wireless network may be due to retransmission delay caused by random packet losses on the wireless link.

A method for measuring available wireless bandwidth is described for use with an illustrative wireless hop of an IEEE 802.11b wireless LAN. The method may be used with other technologies, and the use of an IEEE 802.11b wireless LAN (WLAN) for illustration herein is not intended to limit the invention claimed herein. The raw transmission rate at the physical layer in IEEE 802.11b changes dynamically between four rates: 1 Mbps, 2 Mbps, 5.5 Mbps and 11 Mbps. The selected rate varies according to the perceived Frame Error Rate (FER). The thresholds on FER for switching to a higher or lower rate are implementation-specific.

In one embodiment, the first step for estimating available wireless bandwidth is obtaining the current total raw capacity of the wireless link. After obtaining the current raw capacity of the wireless link, the next step is to estimate packet congestion to assess how much of the raw link capacity is available.

The wireless link raw capacity BPHY at the physical layer may be determined by software generally provided to users by manufacturers of WLAN devices. For example, Cisco Systems provides Aironet "350" client utility software for Windows CE 2.11. The Aironet "350" client utility software includes a site survey function whereby a client adapter may read the status of a wireless link every 250 msec. The Aironet "350" client utility software includes two operational modes: passive and active. In the passive mode, no additional RF traffic is generated by the utility, only actual traffic is monitored and a raw capacity BPHY is estimated. In the active mode, the software allows for setting the characteristics of active probing streams that will be transmitted to estimate performance. Such characteristics include the number of packets to be transmitted, packet size, packet inter-departure delay and raw transmission rate, which, in one embodiment, may be 1, 2, 5.5 or 11 Mbps.

Packets traversing wireless links suffer from additional delays as compared to packets traversing wired links. On wired links, packets typically experience processing, transmission, congestion and propagation delays. On wireless links, packets may additionally experience contention and retransmission delays. As used herein, contention delay refers to the time required for a packet to "grab" a wireless channel, due to the shared nature of the medium. As used herein, retransmission delay refers to the time required to successfully transmit a packet across a lossy wireless link, which may require several attempts. Packet transmission on wireless links may be modeled as described below.

Figure 6:
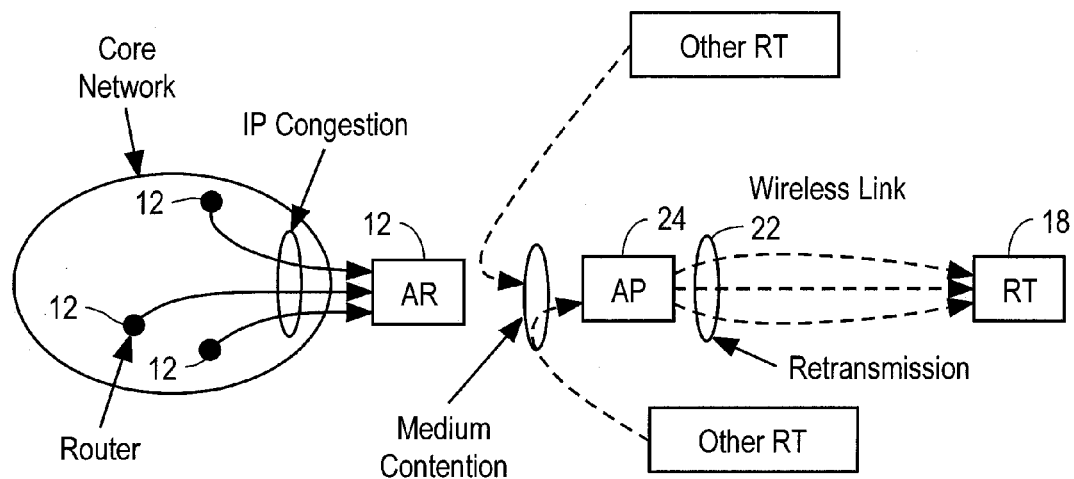
FIGS. 6 and 7 show a model depicting the behavior of packets arriving at an access router (AR), traveling through a corresponding Access Point (AP), traversing a wireless link and reaching a remote terminal.
Figure 7:
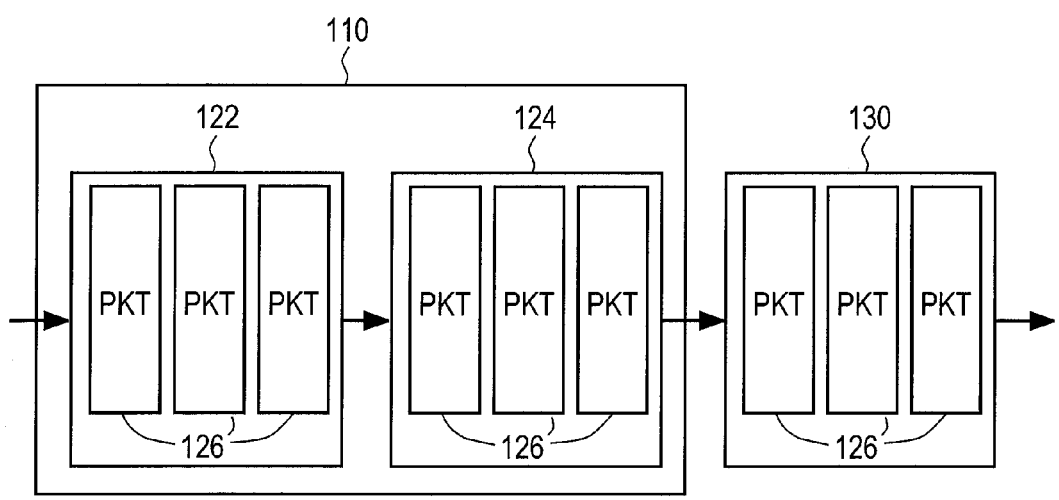

FIGS. 6 and 7 show a model depicting the behavior of packets arriving at an access router (AR) 12, traveling through a corresponding Access Point (AP) 24, traversing the wireless link 22 and reaching the remote terminal 18.

One of packets 126 destined for the remote terminal 18 first reaches the access router 12 where it experiences a queuing delay $q_{congestion}$ in congestion queue 122 waiting for other of packets 126 ahead arriving from other routers 12 to be transmitted. Each of packets 126 emerge from the congestion queue 122 one after the other to enter into contention queue 124. When one of packets 126 comes to the head of the line in congestion queue 122, it experiences a contention delay waiting for the wireless link 22 to become available for transmission. The contention delay is caused by the shared nature of the transmission medium in technologies such as IEEE802.11b.

Each of packets 126 becomes the head of the line in the contention queue 124, it is transmitted across wireless link 22. In case of failure, it reenters contention queue 124 from the tail. This is repeated until the packet is successfully received at remote terminal 18. However, there is a limit n on the number of times one of packet 126 is retransmitted beyond which the packet is simply dropped. In effect, a packet 126 entering the tail of congestion queue 122 on access router 12 experiences a total queuing delay $q^k$ until it reaches remote terminal 18. This delay is given by the equation following:

$$q^k = q^k_{congestion} + A^k t^k_x + (A^k - 1)\tau + \sum_{i=1}^{A^k} B^k_i + t^k_{propagation} \qquad (25)$$

where:

$A^k$ is the total number of transmissions for one packet k at the head of contention queue 124 at access router 12;

$B_i^k$ is the contention time for the $i^{th}$ retransmission of the packet k at the head of the contention queue 124 at access router 12;

$\tau$ is the timeout delay before a retransmission of the packet ahead is decided; this includes the roundtrip propagation delay and the transmission of the acknowledgement packet and processing at the remote terminal 18;

$t_x^k$ is the transmission delay of packet k over wireless link 22;

$t^k_{propagation}$ is the propagation delay of packet k across wireless link 22; and $q^k_{congestion}$ is the time spent by the packet ahead of packet k in both congestion queue 122 and contention queue 124 at access router 12.

Equation (25) can be rewritten in term of averages and ignoring propagation delay (which is around 0.5 μsec for a typical 100 m wireless link 22) as the following equation:

$$\overline{q}^k = \overline{q}^k_{congestion} + \overline{A}^k t^k_x + (\overline{A}^k - 1)\tau + \overline{A}^k + \overline{B}^k \quad (26)$$

Since any packet will be retransmitted up to n times before it is dropped:

$$A^k \leq n, \forall k \quad (27)$$

where n is typically equal to 7 in most implementations of IEEE802.11b.

Two embodiments for estimating the number of transmissions $A^k$ are discussed herein. The first embodiment builds on information provided by the client utility of access point, while the second embodiment uses packet loss estimates.

Turning to the first embodiment, existing utilities for remote terminals 18 or access points 24 typically accumulate information from Table 1 the moment the driver of the client utility of the access point is loaded or the moment wireless link 22 is established until the driver is unloaded or wireless link 22 is terminated. For example, the client utility for a Cisco Aironet "350" WLAN card accumulates the following data in real-time:

TABLE 1

Access Point to Remote Terminal a = number of frames transmitted successfully.
b = number of frames retransmitted.
c = number of frames that exceed maximum number of retries.
d = average contention time.

Figure 8:
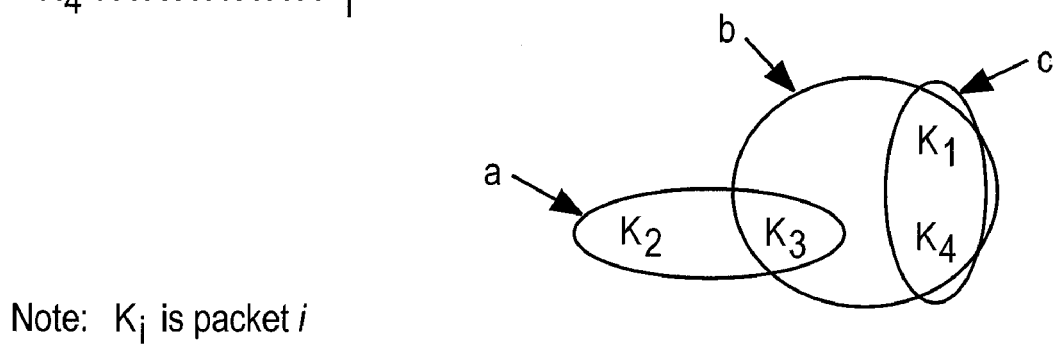
FIG. 8 illustrates the relationship between variables regarding access points to remote terminal communication.

The specific relationship among these variables is further illustrated in FIG. 8.

This accumulated data may be written into a text file. The text file may then be probed at specific time intervals T to calculate variations on each of the variables: Δa, Δb, Δc. The total number of packets handled during interval T is a+c. The total number of transmissions is:

$$[a - (b - c)] \cdot 1 + cn + \sum_{k=1}^{b-c} A^k \leq [a - (b - c)] + cn + (b - c)n =$$

$$[a - (b - c)] + bn$$

On average for one packet k:

$$\overline{A}^k \leq \frac{bn + a - b + c}{a + c} \quad (28)$$

and also:

$$\overline{B}^k = d$$

Using (26), the following is obtained:

$$\overline{q}^k \leq \overline{q}^k_{congestion} + \frac{bn + a - b + c}{a + c} t^k_x + \quad (29)$$

$$\left(\frac{bn + a - b + c}{a + c} - 1\right)\tau + \frac{(bn + a - b + c)d}{a + c}$$

where:

$$t^k_x = \frac{m_k}{B_{PHY}} \quad (30)$$

where k is the size of an 802.11b frame. The timeout delay τ is implementation specific, and $$\overline{q}^k_{congestion}$$

is obtained using WiredCAT congestion estimation described above.

The second embodiment for estimating the number of transmissions A will now be described. Let p be the probability of packet loss on wireless link 22. The number of transmissions experienced by packet k is a random variable $A^k$ where the probabilities for the occurrence of each value of $A^k$ is shown in Table 2 below:

TABLE 2

| $A^k$ | # transmissions | # retransmissions | # losses | # success | probability |
|---|---|---|---|---|---|
| 1 | 1 | 0 | 0 | 1 | $p^0(1-p)$ |
| 2 | 1 | 1 | 1 | 1 | $p^1(1-p)$ |
| 3 | 1 | 2 | 2 | 1 | $p^2(1-p)$ |
| j | 1 | j−1 | j−1 | 1 | $p^{j-1}(1-p)$ |
| n−1 | 1 | n−2 | n−2 | 1 | $p^{n-2}(1-p)$ |
| n | 1 | n−1 | n−1 | 0 | $p^{n-1}(1-p) + p^n$ |

On average, the number of transmissions required for successful transmission of packet k across wireless link 22 is given by:

$$\overline{A}^k = \sum i.probability(i)$$

$$= \sum_{i=1}^{n} ip^{i-1}(1-p) + np^n$$

$$i.e., \overline{A}^k = \frac{1-p}{p}\sum_{i=1}^{n} ip^i + np^n$$

$$= np^n + \frac{np^{n+2} - (n+1)p^{n+1} + p}{p(1-p)^2}$$

Again referring to (26):

$$\overline{q}^k = \overline{q}^k_{congestion} + np^n +$$

$$\frac{np^{n+2} - (n+1)p^{n+1} + p}{p(1-p)^2} t^k_x +$$

$$\left(np^n + \frac{np'^{n+2} - (n+1)p^{n+1} + p}{p(1-p)^2} - 1\right)\tau +$$

$$np^n + \frac{np^{n+2} - (n+1)p^{n+1} + p}{p(1-p)^2} d$$

The fixed terminals 16 of the IP network 10 transmits to remote terminal 18, packets 126 traverse both wired and wireless hops. Therefore, end-to-end packet loss monitoring is not sufficient to infer wireless packet loss. In this scenario, a packet loss observed from the endpoints may be due to either a loss on the wired link because of congestion, or due to a loss on the wireless link because of congestion or random loss and does not correspond to the packet loss of wireless link 22.

A number of implementations may be used to infer wireless packet loss at the network layer. Two such embodiments estimate the loss on the wired hop and then infer behavior on the wireless link from knowledge of end-to-end packet loss through RTCP and packet loss models described below. Both of the embodiments infer wired packet loss via functionality implemented at the path endpoints, in this case fixed terminals 16 and remote terminal 18. These embodiments are performed by processing logic that may comprise hardware (e.g., circuitry, dedicated logic, etc.), software (such as is run on a general purpose computer system or a dedicated machine), or a combination of both.

In one embodiment, processing logic starts by inferring loss on the wired link alone for a system where software or hardware for QoS estimation is only deployed at the path edges. There are proposals to estimate QoS by deploying dedicated software on a router 12 of an access point 24. However, at least one embodiment of the present invention eliminates the requirement for dedicated software on a router 12 of an access point 24.

In another embodiment, processing logic infers wired packet loss at the network layer using ping packets. The essence of this embodiment is to trigger a response from router 12 of access point 24 and infer wired hop packet loss without actually deploying specialized software at the router 12. For that purpose, ping packets are interleaved within a voice packet stream. These pings target router 12 which is revealed by a Traceroute operation on the path. The rate of ping packets interleaving is preferentially set in such a way as to capture packet loss behavior while not exceeding a given overhead to the traffic.

For example, sending one ping every twenty voice packets effectively results in an overhead of five percent in packet count. Since packet loss in wired networks occurs in bursts, observing the loss of ping packets may provide a good approximation of the overall voice packets loss rate. The time interval between ping values is set or varied in order to capture the burstiness of packet loss; as such, it is not a regular interval. The interval may vary in order to capture the behavior of a wired network packet loss model. Exemplary packet loss models are described below under the heading "Packet Loss Models."

The second embodiment infers wired packet loss via additional functionality at the path endpoints. This additional functionality may be implemented as a third stage added to a wired links embodiments described above, in addition to the initialization and measurement stage described above. This new stage is dubbed "router buffer estimation." In one embodiment, the new stage operates as follows. With knowledge of available bandwidth on wired links, the sender transmits a stream of ICMP time-stamp pairs such as is described above at a rate higher than the estimated available bandwidth to each router 12 on the wired hop from fixed terminal 16 to access point 24. The queuing delay at each router is inferred and monitored until ICMP packets start getting lost at the targeted router 12 due to queue overflow. For each router 12 number i, the last observed queuing delay value $q_{max,i}$ is recorded. Then, the queue capacity at each router 12 number i is estimated as being:

$$Q_i = q_{max,i} B_i \tag{31}$$

where $B_i$ values are wired link i raw capacity that has been measured. This router buffer estimation stage may occur only once at the start of the measurement process. Thereafter, WiredCAT may keep repeating the measurement stage until the real-time measurement is ended. The path may be probed every T seconds. An estimate of wired packet loss $p_d$ during the probe interval T is derived, with the assumption of constant conditions during interval T, as follows: If $R_i(T) < B_i$ then:

$$p_d = 0 \text{ during } T.$$

If $R_i(T) > B_i$ then:

$$pd = \frac{R+r-B}{R+r} \text{ during } T - Fi(T); \text{ and} \tag{32}$$

$$pd = 0 \quad \text{ during } Fi(T).$$

So:

$$pd = \frac{T - F_i(T)}{T} \times \frac{R+r-B}{R+r} \text{ during } T.$$

where:

$$F_i(t) = \frac{Q_i - q_i(T) B_i}{R_i(T) - B_i} \tag{33}$$

where Q is in bits, q is in seconds, B and R are in bits/second; R is the total background traffic entering the queue and r is the traffic rate of the application. $F_i(T)$ is the time needed to fill up the queue assuming R remains constant during T.

Packet Loss Models

A method to combine wired and wireless packet loss $p_d$ and $p_w$ respectively to produce path packet loss $p_t$ will now be described. This expression provides a method for inferring $p_w$ after calculating $p_d$ and given a knowledge of p, using the methods discussed above. Good models for packet loss in IP networks include the Bernoulli random loss model, the 2-state Markov chain model (or Gilbert model) and the more complex $k^{th}$ order Markov chains model. Embodiment of the present invention makes use of the former two models, which are described in the following paragraphs.

Figure 9:
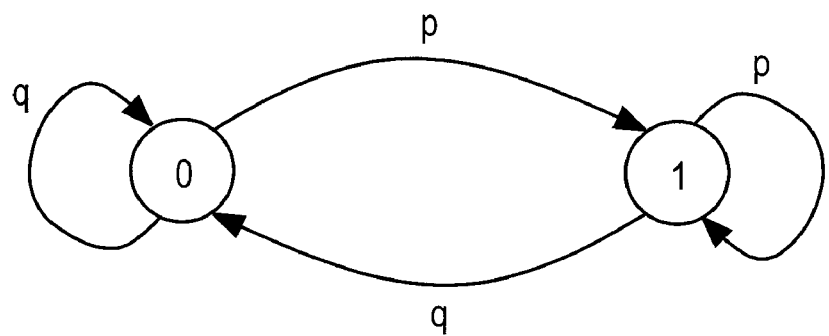
FIG. 9 illustrates a Bernoulli model.

The Bernoulli model is a two-state Markov chain model that can be used to model random and independent packet losses. FIG. 9 below illustrates a Bernoulli model where "0" represents a state of successful packet transmission and "1" represents a loss. The transition probability from state "0" to "1" is denoted by p, and the transition probability from state "1" to "0" is denoted by q. The relation between q and p is as follows:

$$q = 1 - p \tag{34}$$

Figure 10:
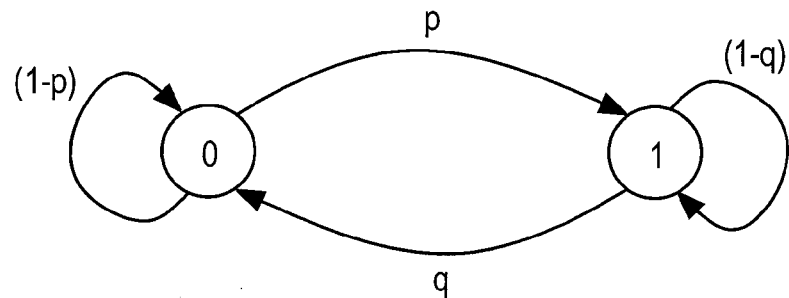
FIG. 10 illustrates a Gilbert model.

The Gilbert model, on the other hand, is a two-state Markov chain model that may represent the burstiness of packet loss due to congestion in IP networks. FIG. 10 illustrates a Gilbert model where "0" represents a state of successful packet transmission and "1" indicates a packet loss. The transition probability from state "0" to "1" is denoted by p, and the transition probability from state "1" to "0" is q. To incorporate the effect of burstiness, q and p do not sum to one as in the case of the Bernoulli model. Instead, the following equation holds:

$$p = \frac{rq}{1-r} \tag{35}$$

where r is the total average packet loss.

Figure 11:
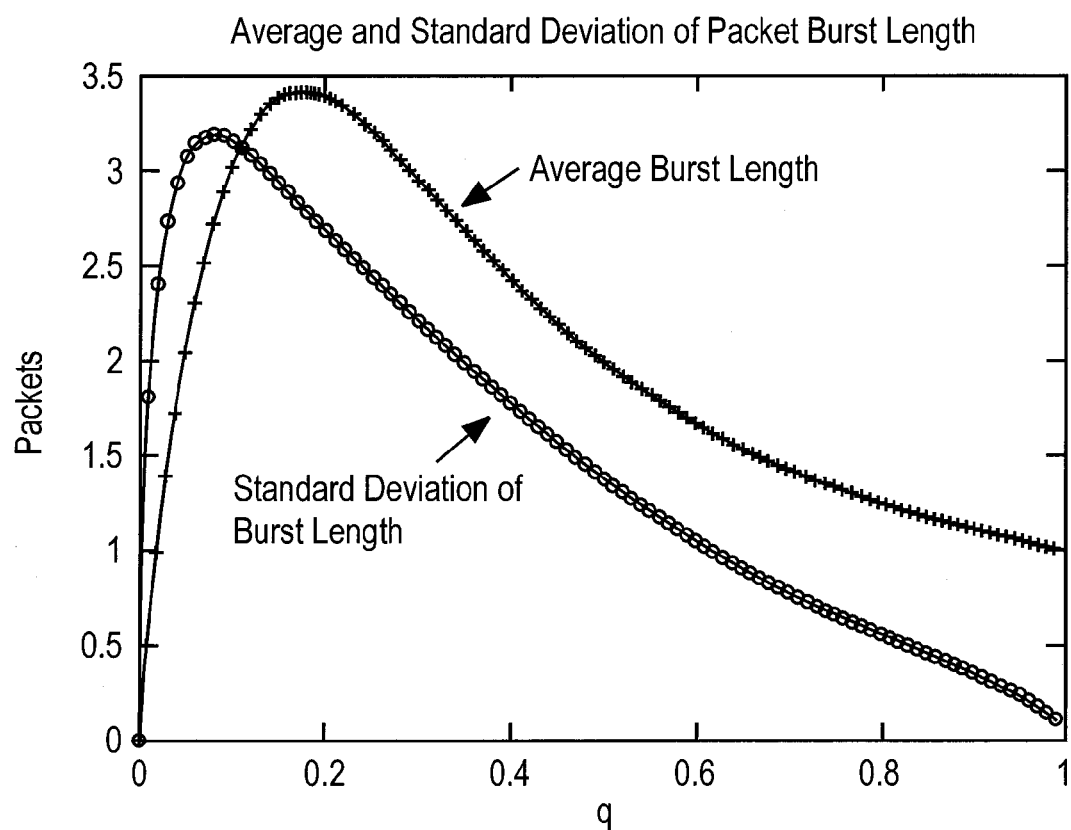
FIG. 11 is a graph depicting average and standard deviation of burst lengths.

The average and standard deviation of burst lengths for the Gilbert model are illustrated in FIG. 11. The burstiness of packet losses Bl relates to the parameters of the model by:

$$Bl = \sum_{n=0}^{\infty} nq(1-q)^{n-1} \qquad (36)$$

Next, path packet loss will be described in order to derive a relation between measured packet losses on the wired and wireless hops and the end-to-end loss that characterizes the entire path. The derivation of the model is divided into two steps. First packet loss models are derived separately for the wireless and wired hops. Then, these two models are combined into a single model.

For the wired hops of the path, the Gilbert packet loss model is used. It is assumed that losses on the wireless hop are due to both congestion at access point 24 and to random losses on wireless link 22. Again, the Gilbert model is used to handle congestion at access point 24, while the Bernoulli model is used to account for random packet losses on wireless link 22. An expression is then derived to relate end-to-end packet loss $p_t$ on a path between endpoints 1 and 2 to the wired hop loss information.

Figure 12:
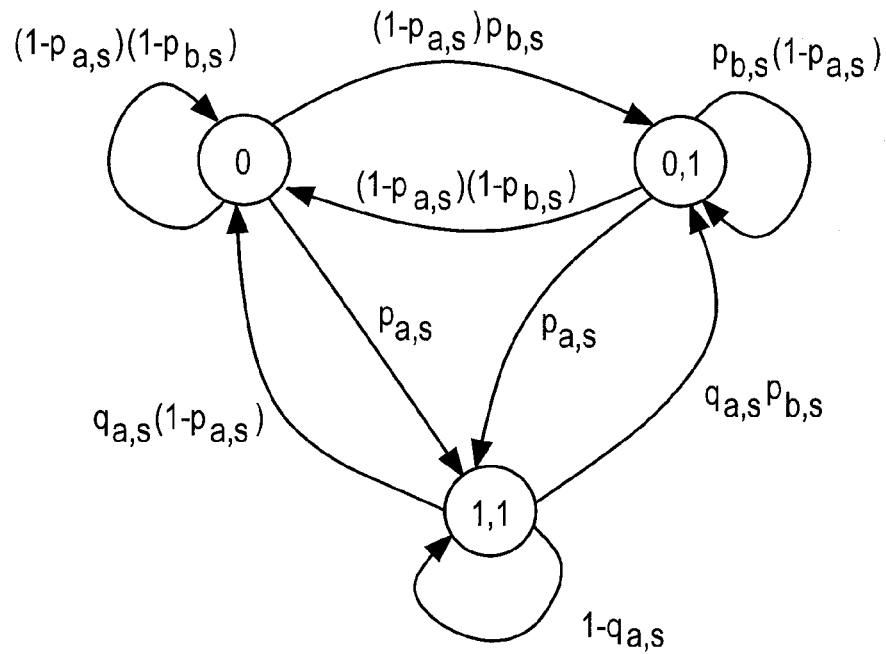
FIG. 12 illustrates a three-state Markov model.

Packet losses on the wireless hop can be due to either congestion at the access point 24 or bit errors at wireless link 22. These two stages are modeled separately as a and b. FIG. 12 illustrates a 3-state Markov model that represents the losses on the wireless hop for a single packet experiencing both congestion at access point 24 and random loss on wireless link 22.

In FIG. 12, $p_{a,s}$ is the conditional packet loss due to congestion, $P_{b,s}$ is the unconditional packet loss due to random effects, and $q_{a,s}$ reflects the unconditional packet loss due to congestion. Parameters relating to congestion are noted with the subscript notation a and parameters pertaining to random losses have the subscript notation b. All of the parameters have the subscript s to show their relation to wireless link 22.

The representation in FIG. 12 uses three states. A value of "0" indicates no loss and a value of "1" signifies a loss. State (a,b) reflects the conditions of transmission (loss or success) at the congestion stage or wireless link 22 stage, respectively. The state (1,1) is effectively the same as (1,0) since a packet lost on the wired hop will not continue to the wireless hop. The three-state model shown in FIG. 12 may be completely described by the following transition probability matrix:

$$\overline{P}_s = \begin{Vmatrix} (1-p_{a,s})(1-p_{b,s}) & (1-p_{a,s})p_{b,s} & p_{a,s} \\ (1-p_{a,s})(1-p_{b,s}) & (1-p_{a,s})p_{b,s} & P_{a,s} \\ q_{a,s}(1-p_{b,s}) & q_{a,s}(1-p_{b,s}) & (1-q_{a,s}) \end{Vmatrix} \qquad (37)$$

To obtain $P_{0,0}$, $P_{0,1}$, and $P_{1,1}$, the system is solved as follows:

$$\left\{ \begin{bmatrix} P_{0,0} \\ P_{0,1} \\ P_{1,1} \end{bmatrix} = \begin{bmatrix} P_{0,0} \\ P_{0,1} \\ P_{1,1} \end{bmatrix} \right\} \qquad (38)$$
$$P_{0,0} + P_{0,1} + P_{1,1} = 1$$

The end-to-end path average packet loss $p_t$ wireless link average packet loss is then given by:

$$r_s = P_{0,1} + P_{1,1} \qquad (39)$$

Equation 39 assumes that packet loss on separate hops is independent. The model does, however, take into account correlation in packet losses on the same link from packet to packet.

Figure 13:
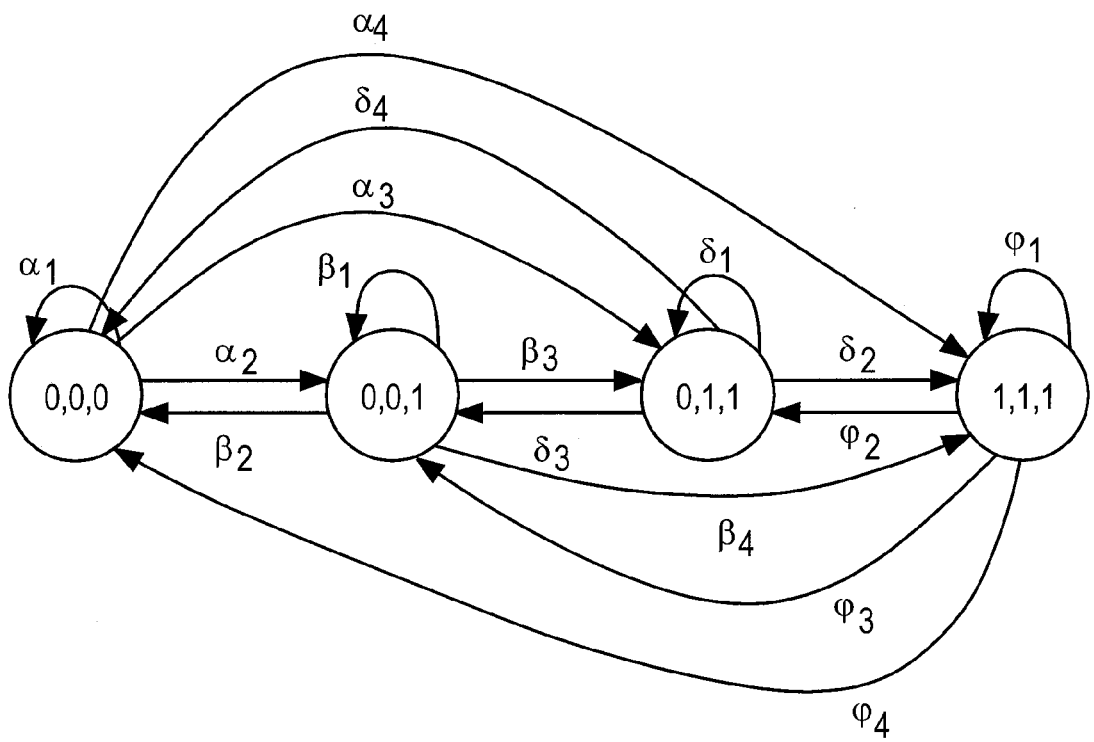
FIG. 13 illustrates a four-state Markov model.

The packet loss model for the entire path, including the wired and wireless hops, is obtained by combining the three state model of FIG. 12 with the Gilbert model, as shown in FIG. 13. In FIG. 13, $p_d$ is the conditional packet loss on the wired hop and $q_d$ reflects the unconditional packet loss on the wired hop. Parameters with the subscript d relate to the wired hop and those with s to the wireless hop. Additionally:

$\alpha_1 = \beta_2 = (1-P_d)(1-p_{a,s})(1-P_{b,s})$ $\alpha_2 = \beta_1 = (1-p_d)(1-p_{a,s})p_{b,s}$ $\alpha_3 = \beta_3 = (1-p_d)p_{a,s}$ $\alpha_4 = \beta_4 = \beta_2 = p_d$ $\delta_1 = (1-p_d)(1-p_{a,s})$ $\delta_3 = (1-p_d)q_{a,s}P_{b,s}$ $\delta_4 = (1-p_d)q_{a,s}(1-p_{b,s})$ $\phi_1 = 1-q_d$ $\phi_2 = q_d(1-q_{a,s})$ $\phi_3 = q_d q_{a,s} p_{b,s}$ $\phi_4 = q_d q_{a,s}(1-p_{b,s}) \qquad (40)$ The model shown in FIG. 13 uses four states, where each state describes the conditions on the wired and wireless hops. A "0" value means no loss and a "1" signifies a loss. State (d,a,b) reflects the conditions of a transmission as a loss or a success at the wired hop, congestion stage of the wireless hop, or wireless hop stage, respectively. The state (0,1,1) is effectively the same as (0,1,0) since a packet lost on the wired hop will not continue to the wireless hop. Similarly, states (1,1,1), (1,0,0), (1,1,0) and (1,0,1) are identical.

The four-state model shown in FIG. 13 may be completely described by the following transition probability matrix:

$$\overline{P}_t = \begin{Vmatrix} \alpha_1 & \alpha_2 & \alpha_3 & \alpha_4 \\ \beta_1 & \beta_2 & \beta_3 & \beta_4 \\ \delta_1 & \delta_2 & \delta_3 & \delta_4 \\ \varphi_1 & \varphi_2 & \varphi_3 & \varphi_4 \end{Vmatrix} \qquad (41)$$

To obtain $P_{0,0,0}$, $P_{0,0,1}$, $P_{0,1,1}$, and $P_{1,1,1}$, the matrix is solved yielding:

$$\left\{ \begin{bmatrix} P_{0,0,0} \\ P_{0,0,1} \\ P_{0,1,1} \\ P_{1,1,1} \end{bmatrix} = \overline{Pt} \begin{bmatrix} P_{0,0,0} \\ P_{0,0,1} \\ P_{0,1,1} \\ P_{1,1,1} \end{bmatrix} \right\} \qquad (42)$$
$$P_{0,0,0} + P_{0,0,1} + P_{0,1,1} + P_{1,1,1} = 1$$

Where the end-to-end path average packet loss $p_t$ is given by:

$$p_t = P_{0,0,1} + P_{0,1,1} + P_{1,1,1} \qquad (43)$$

Equation (43) assumes that packet loss on separate hops is independent. The model does, however, take into account correlation in packet losses on the same link from packet to packet.

The four-state Markov chain model shown in FIG. 13 may be used to calculate $p_t$ from measured average packet losses on the wired and wireless hops $r_d$ and $r_s$, respectively. To calculate $p_t$ using the model, the first step is to calculate $p_d$, $q_d$, $P_{a,s}$, $p_{b,s}$ and $q_{a,s}$. A value for $q_d$ and $q_{a,s}$ may be obtained by maintaining a measurement of average packet burst length and using equation (36) and the graph shown in FIG. 11, as described above. A starting value for both $q_d$ and $q_{a,s}$ may be 0.9, corresponding to an average loss of 1.11 packets/burst and standard deviation of 0.35 packets/burst. (See FIG. 11). These values have been shown to be the most probable for Internet, currently. As the Internet evolves, other starting values may be preferred.

From equation (35), $p_d$ may be obtained as follows:

$$p_d = \frac{r_d q_d}{1-r}$$

The value of $p_{a,s}$ may be obtained by solving the following system of three equations and two unknowns $\{p_{a,s}; p_{b,s}\}$:

$$r_s = P_{0,1} + P_{1,1} \qquad (45)$$

$$\left\{ \begin{bmatrix} P_{0,0} \\ P_{0,1} \\ P_{1,1} \end{bmatrix} = \overline{P}_s \begin{bmatrix} P_{0,0} \\ P_{0,1} \\ P_{1,1} \end{bmatrix} \right\}$$
$$P_{0,0} + P_{0,1} + P_{1,1} = 1$$

$$P_s = \begin{Vmatrix} (1-p_{a,s})(1-p_{b,s}) & (1-p_{a,s})p_{b,s} & p_{a,s} \\ (1-p_{a,s})(1-p_{b,s}) & (1-p_{a,s})p_{b,s} & p_{a,s} \\ q_{a,s}(1-p_{b,s}) & q_{a,s}(1-p_{b,x}) & (1-q_{a,s}) \end{Vmatrix},$$

where $r_s$ is the measured average packet loss on the wireless link, $q_{a,s}$ is calculated as described above. Once the values of $p_d$, $q_d$, $p_{a,s}$, $p_{b,s}$ and $q_{a,s}$ are known, equation (42) may be solved for $P_{0,0,0}$, $P_{0,0,1}$, $P_{0,1,1}$, and $P_{1,1,1}$. Finally, plugging the values for $P_{0,0,0}$, $P_{0,0,1}$, $P_{0,1,1}$, $P_{1,1,1}$ and $P_{1,1,1}$, plugging into equation (43) will yield the end-to-end path average packet loss $p_t$.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method of estimating end-to-end path capacity in a network, comprising:
   probing an end-to-end path to identity addresses of all hops on the end-to-end path;
   generating and transmitting, by a terminal node on the end-to-end path, a first time-stamp request packet to a first hop and subsequent two time-stamp request packets to a second hop, wherein the first time-stamp request packet and the subsequent two time-stamp request packets are three consecutive request packets, and the first hop and the second hop are two consecutive hops on the end-to-end path; receiving an initial time stamp from the first hop and two subsequent time stamps from the second hop in response to the three consecutive request packets;
   generating and transmitting, by the terminal node, a first packet of a pair of consecutive time-stamp request packets to the first hop and a second packet of the pair to the second hop; and
   receiving and processing at least one time-stamp generated by the two consecutive hops to produce at least one QoS estimate of a link that couples the two consecutive hops on the end-to-end path.

2. The method of claim 1, wherein probing on the end-to-end path comprises using a Traceroute application to identify hops on the end-to-end path.

3. The method of claim 1, wherein probing the end-to-end path occurs from one selected from a group consisting of a source node, a destination node, and both a source node and a destination node.

4. The method of claim 1, wherein processing the time-stamp is performed at one selected from a group consisting of a source node, a destination node, and both a source and destination node.

5. The method of claim 1, wherein the time-stamp request packets are ICMP requests.

6. The method of claim 1, wherein the number of generated and processed time-stamp request packets is at least five.

7. The method of claim 1, further comprising generating pairs of time-stamp request packets more often to specific hops on the end-to-end path.

8. The method of claim 7, wherein hops subject to more frequent probing are determined based on at least one of:
   a variation pattern of utilization;
   a queuing delay, a queue size, a processing delay, an available bandwidth, and a congestion status.

9. The method of claim 1, further comprising generating time-stamp requests less often to specific hops on the end-to-end path.

10. The method of claim 9, wherein hops subject to less frequent probing are determined based on at least one of:
    a variation pattern of utilization;
    a queuing delay, a queue size, a processing delay, an available bandwidth, a congestion status.

11. The method of claim 1, further comprising introducing certain latency between consecutive time-stamp request packet transmissions.

12. The method of claim 1, further comprising increasing a time-stamp request packet size by adding dummy data to one or more of the time-stamp request packets to increase sensitivity in the case of a fast link.

13. The method of claim 5, further comprising increasing a ICMP request size by adding dummy data in an IP payload field of an ICMP request to increase sensitivity in the case of a fast link.

14. The method of claim 1, wherein the QoS estimate comprises a link and path capacity.

15. The method of claim 1, wherein the QoS estimate comprises an estimate of queuing delay at one of the two consecutive hops.

16. The method of claim 1, wherein the QoS estimate comprises an estimate of link and path utilization.

17. The method of claim 1, wherein the QoS estimate comprises an estimate of link and path available bandwidth.

18. The method of claim 1, wherein the QoS estimate comprises an estimate of interfering flows at one of the two consecutive hops.

19. The method of claim 1, further comprising restarting probing of the end-to-end path in the case of a change in routing tables.

20. An article of manufacture having one or more recordable media storing instructions thereon which, when executed by a system, cause the system to estimate end-to-end path capacity in a network by:
- probing an end-to-end path to identify addresses of all hops on the end-to-end path;
- generating and transmitting a first time-stamp request packet to a first hop and subsequent two time-stamp request packets to a second hop, wherein the first time-stamp request packet and the subsequent two time-stamp request packets are three consecutive request packets, and the first hop and the second hop are two consecutive hops on the end-to-end path;
- receiving an initial time stamp from the first hop and two subsequent time stamps from the second hop in response to the three consecutive request packets;
- generating and transmitting a first packet of a pair of time-stamp request packets to the first hop and a second packet of the pair to the second hop; and
- receiving and processing at least one time-stamp generated by the two consecutive hops to produce at least one QoS estimate of a link that couples the two consecutive hops on the end-to-end path.

21. A router comprising:
- a queue to store outgoing packets;
- IP processing coupled to the queue to probe an end-to-end path in a network to identify addresses of all hops on the end-to-end path, generate and transmit a first time-stamp request packet to a first hop and subsequent two time-stamp request packets to a second hop, wherein the first time-stamp request packet and the subsequent two time-stamp request packets are three consecutive request packets, and the first hop and the second hop are two consecutive hops on the end-to-end path, receive an initial time stamp from the first hop and two subsequent time stamps from the second hop in response to the three consecutive request packets, generate and transmit a first packet of a pair of time-stamp request packets to the first hop and a second packet of the pair to a second hop, and receive and process at least one time-stamp generated by the two consecutive hops to produce at least one QoS estimate of a link that couples the two consecutive hops on the end-to-end path.

22. A method of estimating end-to-end path capacity in a network, comprising the steps of:
- probing an end-to-end path to identify addresses of a plurality of hops on the end-to-end path;
- generating and transmitting, by an origination node on the end-to-end path, a first time-stamp request packet to a first hop and subsequent two time-stamp request packets to a second hop, wherein the first time-stamp request packet and the subsequent two time-stamp request packets are three consecutive request packets, and the first hop and the second hop are two consecutive hops on the end-to-end path; receiving an initial time stamp from the first hop and two subsequent time stamps from the second hop in response to the three consecutive request packets;
- generating and transmitting, by the origination node, a first packet of a pair of time-stamp request packets to the first hop and a second packet of the pair to the second hop, the pair of time-stamp request packets having an origination address of the origination node spoofed to that of another hop on the network; and
- receiving and processing in at least one hop on the network at least one time-stamp to produce a QoS estimate.

23. The method of claim 22, wherein probing the end-to-end path comprises using a Traceroute application to identify addresses of the plurality of hops.

24. The method of claim 22, wherein the origination address is that of a source node on the end-to-end path.

25. The method of claim 22, wherein the origination address is that of a destination node on the end-to-end path.

26. The method of claim 22, wherein probing the end-to-end path is generated from a source node.

27. The method of claim 22, wherein probing the end-to-end path is generated from a destination node.

28. The method of claim 22, wherein probing the end-to-end path is generated from a source node and a destination node.

29. The method of claim 22, wherein the QoS estimate comprises an estimate of link and path capacity.

30. The method of claim 22, wherein the QoS estimate comprises an estimate of queuing delay at one of the two consecutive hops.

31. The method of claim 22, wherein the QoS estimate comprises an estimate of link and path utilization.

32. The method of claim 22, wherein the QoS estimate comprises an estimate of link and path available bandwidth.

33. The method of claim 22, wherein the QoS estimate comprises an estimate of interfering flows at one of the two consecutive hops.

34. The method of claim 22, further comprising refining the QoS estimate by taking into consideration a propagation delay.

35. An article of manufacture having one or more recordable media storing instructions thereon which, when executed by a system, cause the system to estimate end-to-end path capacity in a network by:
- probing an end-to-end path to identify addresses of a plurality of hops on the end-to-end path;
- generating and transmitting, by an origination node, a first time-stamp request packet to a first hop and subsequent two time-stamp request packets to a second hop, wherein the first time-stamp request packet and the subsequent two time-stamp request packets are three consecutive request packets, and the first hop and the second hop are two consecutive hops on the end-to-end path;
- receiving an initial time stamp from the first hop and two subsequent time stamps from the second hop in response to the three consecutive request packets;
- generating and transmitting, by an origination node, a first packet of a pair of time-stamp request packets to the first hop and a second packet of the pair to the second hop, the pair of time-stamp request packets having an origination address of said origination node spoofed to that of another hop on said network; and
- receiving and processing in at least one hop on said network at least one time-stamp generated by the two consecutive hops to produce a QoS estimate.

* * * * *